(12) United States Patent  (10) Patent No.: US 8,082,448 B2
Vandervort  (45) Date of Patent: Dec. 20, 2011

(54) SYSTEM AND METHOD FOR USER AUTHENTICATION USING NON-LANGUAGE WORDS

(75) Inventor: David Russell Vandervort, Walworth, NY (US)

(73) Assignee: Xerox Corporation, Norwalk, CT (US)

(*) Notice: Subject to any disclaimer, the term of this patent is extended or adjusted under 35 U.S.C. 154(b) by 588 days.

(21) Appl. No.: 12/259,626

(22) Filed: Oct. 28, 2008

(65) Prior Publication Data

US 2010/0106975 A1   Apr. 29, 2010

(51) Int. Cl.
   *H04L 9/32* (2006.01)
   *H04L 9/00* (2006.01)
   *G06F 12/14* (2006.01)

(52) U.S. Cl. ........ 713/186; 713/187; 713/188; 713/189; 713/190; 713/194; 726/27; 726/28; 726/29; 726/30

(58) Field of Classification Search .................... 713/186
   See application file for complete search history.

(56) References Cited

U.S. PATENT DOCUMENTS

| | | | |
|---|---|---|---|
| 5,499,288 A | 3/1996 | Hunt et al. | |
| 6,681,205 B1 | 1/2004 | San Martin et al. | |
| 6,973,575 B2 | 12/2005 | Arnold | |
| 7,212,613 B2 | 5/2007 | Kim et al. | |
| 7,360,694 B2 | 4/2008 | Wankmueller | |
| 7,711,560 B2* | 5/2010 | Yamada et al. | 704/255 |
| 2008/0103972 A1* | 5/2008 | Lanc | 705/44 |
| 2009/0006093 A1* | 1/2009 | Das | 704/246 |

* cited by examiner

*Primary Examiner* — Longbit Chai
(74) *Attorney, Agent, or Firm* — MH2 Technology Law Group LLP

(57) ABSTRACT

A system and method for user authentication include a user instructing component and a voice authentication component. The user instructing component generates an instruction for authenticating a voice of a user. The instruction includes a first instruction to recite one or more non-language words. The voice authentication component analyzes a sound signal which includes a response to the instruction. The voice authentication component can authenticate the voice of the user using the response to the instruction including a response to the first instruction to recite the one or more non-language words.

20 Claims, 3 Drawing Sheets

SYSTEM AND METHOD FOR USER AUTHENTICATION USING NON-LANGUAGE WORDS

BACKGROUND

1. Technical Field

The present disclosure relates to user authentication, and in particular, to a system and method for user authentication using non-language words.

2. Description of Related Art

Certain organizations engage in sensitive transactions, such as banks, brokerage houses, the military, intelligence services and other entities. Some of these services deal with information that may be personally, financially or even legally sensitive. Many of these transactions are conducted from remote locations using communications technologies such as the internet, land based phones (e.g., Voip or POTS), cell phones, IP based phones, using ATM machines and the like. Additionally, remote authentication is sometimes employed to control access to facilities or buildings; for example, an organization may have several facilities located throughout the world with each having several entrances. Security protocols to these various facilities or entrances may include authentication technology, such as card access, biometric devices and the like. In some situations, it is advantageous to have the authentication servers located centrally such that the data used to authenticate a person is centrally protected and managed.

Verifying that users are entitled to access is sometimes done using a two-factor system of authentication. A cell phone or other mobile device is enrolled in the system and the system associates the phone number with the name of the owner. When a transaction takes place, the originating number is compared to a list of authorized telephone numbers (via caller ID) and an SMS message is sent back asking to the user's phone to reply with a pin number, which is used to validate and/or authenticate the user's identity.

These pin numbers are sometimes restricted to digits 0 through 9. The small number of allowable characters (10) coupled with a pin numbers of 4 to 6 digits (enough to hold a birth date, for example) make them less than ideal than digital keys (with a usual length of 128 or 256 bits), in certain environments; however, digital keys are unsuitable for use with some cell phones models. Certain cell phone models keep records of messages sent such that the pin number is extractable from previous uses of the system by anyone who happens to acquire the phone or, in some cases, someone who accesses to the phone from a small distance using a Bluetooth compatible device.

Some mobile devices have limited security capabilities because of the limitations of the hardware. Biometric devices, such as fingerprint readers, can be conveniently attached to a desktop computer, but it is unreasonable to expect mobile users to carry bulky models of fingerprint readers around to attach to their cell phone whenever they want to perform a sensitive transaction. Standard industry practice is to send an SMS message to the originating phone requesting confirmation. If proper security precautions are not implemented and the phone falls into skilled hands, security breaches may be possible.

Some proposed security protocols utilize voice authentication. Voice authentication uses a person's voice for authentication. Two types of voice authentication involve: (1) having the user recite the same words used in the registration session during the authentication session or (2) having the user recite some words not recited in the registration session during the authentication session; these two types are referred to herein as registration-word dependent authentication and registration-word independent authentication, respectively. The probability of obtaining a voice match during a registration-word independent authentication session depends, in part, on the length of the sample being matched; and the more time the user speaks, the probability of acquiring enough data to make (or reject) a match with sufficient certainty increases in this type of authentication session. However, other factors also affect the ability to make (or reject) a match, such as the quality of the sound signal. Some voice authentication technologies that utilize a registration-word dependent authentication session need at least 30 seconds of speech to make a match.

Therefore, the parameters of a strong mobile authentication method using voiceprint matching should include a way to keep the subject talking for a threshold amount of time (e.g., at least 30 seconds) and extending the time if, for some reason, more data is needed to verify the match. It should also reject easily discovered information such as the subject's address. It must also avoid using a subject's social security number, since storing and transmitting SSNs create an unacceptable risk for identity theft. The method should also include protections against clever attempts at recording or digitizing the subject's voice beforehand in order to defeat voice-based security.

SUMMARY

The present disclosure relates to user authentication, and, in particular, to a system and method for user authentication using non-language words.

In one embodiment of the present disclosure, a system for user authentication includes a user instructing component and a voice authentication component. The user instructing component generates an instruction for authenticating a voice of a user. The instruction is modifiable. The instruction includes a first instruction to recite at least one non-language word. The voice authentication component analyzes a sound signal, which can include a response to the instruction. The voice authentication component authenticates the voice of the user using the response to the instruction including a response to the first instruction to recite the at least one non-language word. The voice authentication component may be configured to analyze a non-language word utilized during a registration session such that the authentication component utilizes registration-word dependent authentication and/or may be configured to analyze a non-language word generated during a non-registration session such that the authentication component utilizes registration-word independent authentication.

The sound signal may be an analog sound signal, a digital sound signal, a lossy-compressed digital sound signal, a lossless-compressed digital sound signal, a MP3 sound signal, a MP4 sound signal, an encapsulated digital sound signal, a FDMA-encapsulated digital sound signal, a CDMA-encapsulated digital sound signal, a TDMA-encapsulated digital sound signal, a FDD-encapsulated digital sound signal and a GSM encapsulated digital sound signal, and/or the like.

The system may also include a non-language word generator which generates the at least one non-language word. The non-language word generator randomly generates the at least one non-language word, e.g., the non-language word generator randomly and sufficiently concatenates syllabi together to form one or more non-language words (the word "randomly" also implies pseudorandom techniques herein). The non-language word generator can generate the non-language word during an authentication session of the voice authentication component, e.g., on-the-fly non-language word generation. The system may also include a calibration component. The calibration component calibrates the voice authentication component such that the voice authentication component can authenticate the voice of the user. The calibration component can generate a digital voiceprint of the user to calibrate the voice authentication component.

In another embodiment of the present disclosure, the instruction includes a second instruction to recite at least one language word. The sound signal can further include a response to the second instruction. The voice authentication component can further authenticate the voice of the user using the response to the second instruction. The at least one language word can be randomly chosen among a plurality of language words.

In another embodiment of the present disclosure, the instruction includes a third instruction. The third instruction is to recite a predetermined password. The sound signal is further configured to include a response to the third instruction within the response to the instruction. The voice authentication component is further adapted to authenticate the voice of the user using the response to the third instruction. The system can include a password storage component. The password storage component can perform an encryption algorithm on a phonetic text version of the predetermined password. The voice authentication converts the response to the third instruction to a phonetic text version of the response to the third instruction and compares the encrypted, phonetic, text version of the predetermined password to an encryption of the phonetic text version of the response to the third instruction.

In another embodiment of the present disclosure, the system includes a pin-number authentication component. The pin-number authentication component receives a pin number to authenticate the user. The pin number may be received by the pin-number authentication component utilizing a Short Message Service message (i.e., a SMS message, which is also referred to as a "Text message").

In yet another embodiment of the present disclosure, the system includes a telephone interface component. The telephone interface component operatively communicates using a telephone network and the sound signal is received from the telephone network during a phone call. The telephone interface component initiates the phone call and/or receives the phone call.

The telephone interface component can initiate and/or receive the phone call using the telephone network such that the voice authentication component receives the sound signal from the telephone network during the phone call and the telephone interface component converts the user instruction to another sound signal for transmitting to the user using the telephone network during the phone call. The system can also include a telephone authentication component. When the telephone interface component receives the phone call, the telephone authentication component authenticates the user using a caller ID signal. The caller ID signal indicates a source number of the user. The telephone authentication component compares the source number of the user to one or more authorized source numbers.

The system may also include an error-detection component to determine errors of the sound signal. The error-detection component operatively communicates a detected error to the user instructing component. The instructing component can generate, if necessary, at least one supplemental instruction for authenticating the voice of the user. A supplemental instruction may be necessary when the system does not have sufficient voice data and/or sufficient voice data quality to authenticate a user. The instruction for authenticating the voice of the user includes the at least one supplemental instruction.

In yet another embodiment of the present disclosure, a method for user authentication includes: generating an instruction to recite at least one non-language word; communicating the instruction to a user; analyzing a vocal response to the instruction; and authenticating the user using the vocal response to the instruction. The method may also include comparing the vocal response to a digital voiceprint. As previously mentioned, the method includes generating an instruction to recite at least one non-language word, which may itself include randomly joining syllabi to generate the at least one non-language word.

In yet another embodiment of the present disclosure, an installable module installable in an apparatus includes a user authentication component. The user authentication component is at least partially implemented by an operative set of processor executable instructions configured for execution by at least one processor. The user authentication component includes a user instructing component and a voice authentication component.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
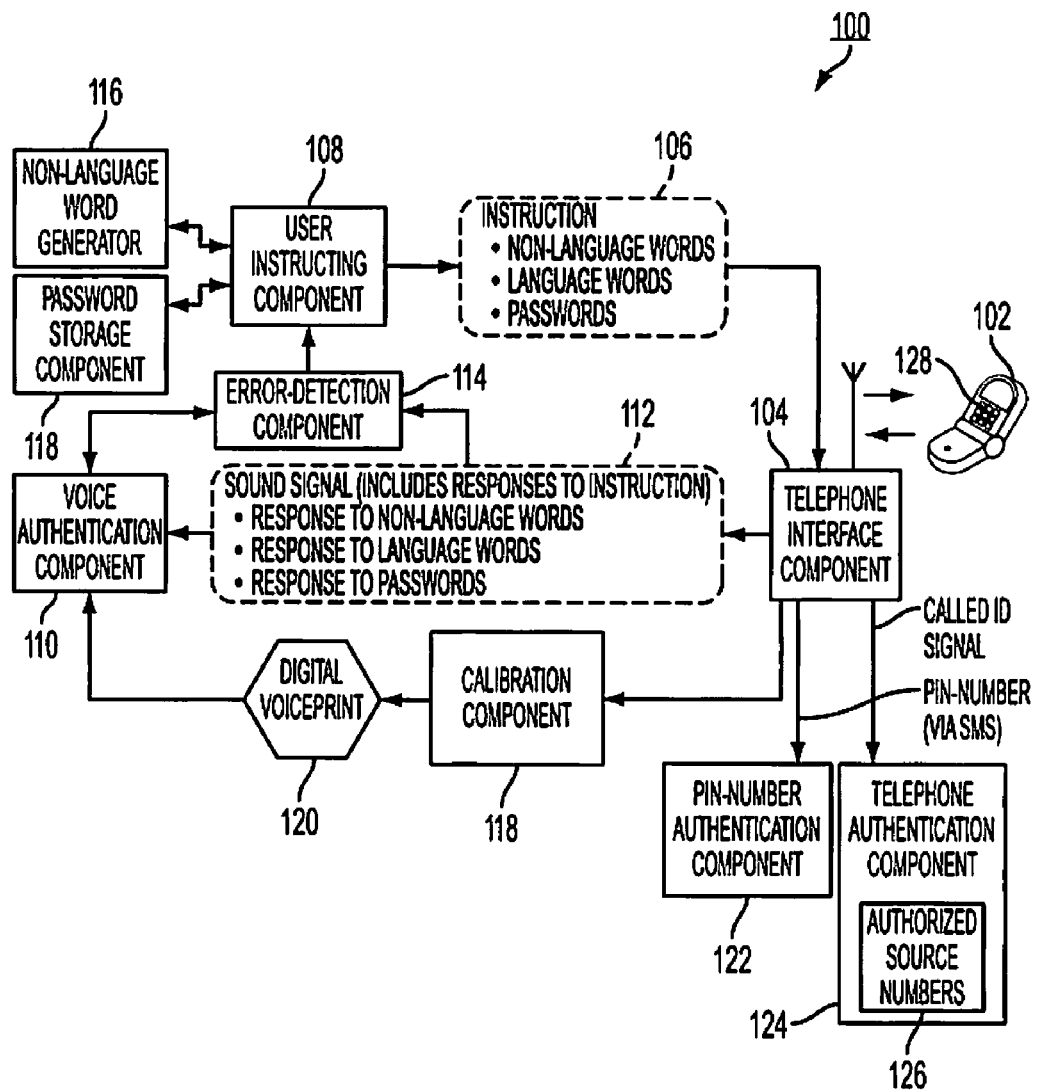
FIG. 1 is a block diagram of a system for user authentication using non-language words in accordance with the present disclosure.

Referring to the drawings, FIG. 1 is a block diagram of a system 100 for user authentication using non-language words in accordance with the present disclosure. System 100 may be implemented, wholly or partially, in hardware, software, software in execution, firmware, microcode, CPLDs, PALs, FPLGs, hardware description language, bytecode, a virtual machine, emulation, on one or more processors and the like. For example, system 100 may be implemented by one or more x86-processor based computers (not shown).

System 100 can authenticate a user (not shown) using a user's voice. Specifically, system 100 can authenticate a user's voice using cell phone 102. A person's voice is somewhat specific to that person in the same way a fingerprint or a person's iris is specific to a person. This quality makes a person's voice well suited for authentication. Cell phone 102 operatively communicates with telephone interface component 104. Cell phone 102 may be considered part of or separate from system 100. System 100 can authenticate a user's voice by having the user recite non-language words (discussed below).

Telephone interface component 104 may be a cell phone tower, a Wifi router (e.g., cell phone 102 may be a wifi phone that utilizes VoIP), a CDMA-based tower, a GSM tower, a UMTS tower, a PCS tower and the like. The communications between cell phone 102 and telephone interface component 104 may be wireless, wired, through the internet, or may utilize other sufficient communications technology. The communications between telephone interface component 104 and cell phone 102 may be digital or analog, e.g., the communications between the two is a sound signal and may be one of an analog sound signal, a digital sound signal, a lossy-compressed digital sound signal, a lossless-compressed digital sound signal, a MP3 sound signal, a MP4 sound signal, an encapsulated digital sound signal, a FDMA-encapsulated digital sound signal, a CDMA-encapsulated digital sound signal, a TDMA-encapsulated digital sound signal, a FDD-encapsulated digital sound signal, and a GSM encapsulated digital sound signal and the like. The sound signal from cell phone 102 can include sound from a person's voice, which is used by system 100 for authentication.

More particularly, instruction 106 can include audible (or written) commands or requests for a user to speak (i.e., recite) into cell phone 102 for authentication. Instruction 106 includes requests to recite non-language words, language words and/or passwords. User instructing component 108 generates instruction 106. Instruction 106 may be converted by telephone interface component 104 into a sound signal, which is transmitted to cell phone 102. Additionally or alternatively, user instruction component 108 converts instruction 106 to sound before sending to telephone interface component 104 which can convert instruction 106 to sound. In other embodiments not explicitly depicted, instruction 106 may be sent as text, e.g., as text on a computer screen in which the user speaks into a microphone during a Voip session.

Instruction 106 may be sent to cell phone 102 via text message (e.g., via SMS). Sending the instruction 106 via text message may be in addition to (or alternative to) sending instruction 106 as a sound signal. A predetermined period of time is available for a response to instruction 106. When a user receives instruction 106, the user can speak into a microphone of cell phone 102, which is thereafter transmitted to telephone interface component 104. The sound is passed to voice authentication component 110 as sound signal 112. Sound signal 112 can include a response to non-language words, a response to language words, and a response to passwords. The sound signal 112 is analyzed by voice authentication component 110 for user authentication.

Error-detection component 114 can determine whether or not voice authentication component 110 has enough (or sufficient) quality data regarding sound signal 112. For example, error-detection component 114 can detect errors within sound signal 112 and communicate the detected error to user instructing component 108. The detected error may be from poor quality of sound signal 112 caused by a poor connection, wind blowing into the speaker, static noise, background noise and the like. The detected error can also be from a wrong, missing, or incorrect response to instruction 106. User instructing component 108 can generate supplemental instructions, e.g., a supplemental instruction that includes supplemental non-language words and/or supplemental language words. The supplemental instruction (not explicitly represented) is sent to cell phone 102. The supplemental instruction is necessary when voice authentication component 110 needs additional voice data to authenticate a user.

As previously mentioned, user instructing component 108 generates instruction 106. User instructing component 108 may receive data from non-language word generator 116 and/or from password storage component 118. Alternatively, it is envisioned that non-language word generator 116 and/or password storage component 118 may be part of user instructing component 108 (not depicted). Non-language word generator 116 generates non-language words during an authentication session for inclusion in instruction 106. Non-language words may be generated "on the fly" and may include one or more syllabi. For example, a non-language word may be "lalaloli". Non-language word generator 116 may aggregate several syllabi, letters, sounds, words, phrases, inflections, vowels, consonants, articulations, clicks, grunts, accents, other sounds possible by a human, and/or some combination thereof. Although "word" is used in the phrase "non-language word", the non-language word need not have communicative value, however, communicate value may arise by coincidence. For example, a non-language word 116 may be generated to authenticate an English speaking user, and by coincidence, the non-language word may sound similar to or identical to a word in another language.

Instruction 106 may also include an instruction to recite language words. Adding language words, e.g., "dog", may increase usability of system 100. The mixture of non-language words and language words may be configurable and/or settable by an administrator. The mixture may be chosen based upon several factors, including: recitation time thresholds, security, reliability, and the like. Thirty seconds of recitation time may be sufficient for voice authentication component 110 to authenticate a user's voice. Also, system 100 may be configurable for various languages, e.g., the language words chosen may be from a language chosen by the administrators.

System 100 can authenticate a user while the user is mobile because cell phone 102 is a mobile phone. However, other mobile devices (e.g., wifi-based Voip phones) may also be used with system 100. The mobility of cell phone 102 enables a user to engage in services or transactions which are personally, financially or even legally sensitive. When the user attempts to make the transaction, either during a call or otherwise, voice authentication may be required. The user can either call telephone interface component 104 and recite instruction 106, or telephone interface component 104 may call cell phone 102 based upon a stored authorized number.

System 100 also includes a calibration component 118 in operative communications with telephone interface component 104. Calibration component 118 generates a digital voiceprint 120. Calibration component 118 generates digital voiceprint 120 utilizing one or more of frequency estimation, hidden Markov models, gaussian mixture models, pattern matching algorithms, neural networks, matrix representation, decision trees and the like. Additionally or alternatively, system 100 may use "anti-speaker" techniques, such as cohort models, world models, and the like. Digital voiceprint 120 is utilized by voice authentication component 110 such that voice authentication component 110 authenticates a user speaking into cell phone 102.

System 100 also includes pin-number authentication component 122 and telephone authentication component 124. Telephone authentication component 124 includes authorized source numbers 126. Pin-number authentication component 122 may require that the user of cell phone 102 verbally recite a pin-number and/or enter in a pin-number using a keypad 128 of cell phone 102. Additionally or alternatively, system 100 may also utilize telephone authentication component 125. Telephone authentication component 124 may require that the cell phone 102 have a phone number included in a list of authorized source numbers 126.

Figure 2:
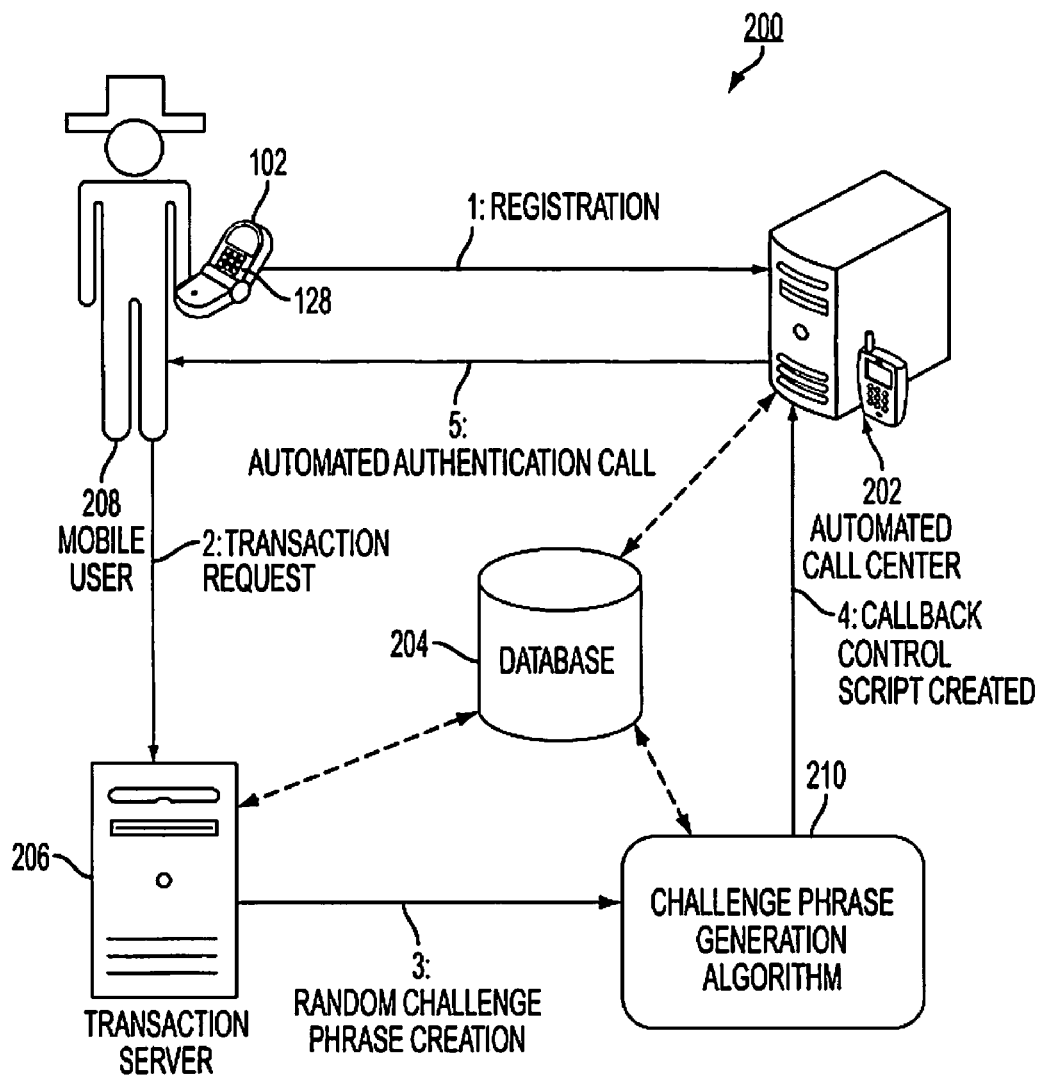
FIG. 2 is a block diagram illustrating transactions for user authentication using non-language words in accordance with the present disclosure.

FIG. 2 is a block diagram 200 illustrating transactions used for user authentication using non-language words. Diagram 200 shows an automated call center 202, a database 204 and a transaction server 206. Stages 1 through 5 are shown.

Referring to FIGS. 1 and 2, during stage 1, user 208 registers to generate a digital voiceprint 120. User 208's voice is sampled by automated call center 202. During stage 1, user 208 can call automated call center 202, thereafter an automated algorithm prompts him or her with a request for a voice sample e.g., instruction 106 (see FIG. 1). Digital voiceprint 120 is generated and is stored in database 204.

Automated call center 202 may use files written in Voice XML (VXML), may utilize pbx for interfacing with the phone system, and the like. User 208 may also select a password and/or a pin-number, which may also be stored in database 204. The password, pin-number and/or digital voiceprint 120, may be stored as text, phonetic text, encrypted text, encrypted phonetic text, encrypted form, symmetrical encryption form, asymmetrical encryption form, as a hashed form (e.g., SH1 or MD5 hashes), and the like. For example, a phonetic text form of a password may be stored after being hashed with a MD5 algorithm; when user 208 transmits a possible password to automated call center 202, the possible password is converted to a phonetic text form and is hashed using the MD5 algorithm, which may then be compared to the stored and hashed phonetic-text form of the password. Other encryption schemes may utilize AES encryption. The encryption technology may utilize one-way encryption so that even administrators do not know users' passwords. Additionally or alternatively, in some embodiments, the stored encrypted password may be recoverable. However, features of a user's voice may be stored in encrypted form as well (e.g., digital voiceprint 120 may be stored in encrypted form).

During stage 2 a transaction request is made. User 208, for example, may desire to transfer money from one account to another, e.g., a bank transaction. User 208 can initiate this sensitive transaction (or other transactions), by logging into a website (not explicitly shown) or by calling into transaction server 206. During stage 3, transaction server 206 sends a signal to challenge phrase generation algorithm 210. Challenge phrase generation algorithm 210 may be implemented by one or more of non-language word generator 116, password storage component 118, and/or user instructing component 108. Challenge phrase generation algorithm 210 can generate instruction 106. The challenge phrase generation algorithm 210 generates instruction 106, which is communicated to automated call center at stage 4. During stage 4, a script is generated which includes a control script, instruction 106, password prompts, control logic to allow the user to request that a challenge phrase be repeated or skipped (e.g., for hard of hearing users), and the like. Automated call center 202 can utilize the script. At stage 5, an automated authentication call is made to cell phone 102 of user 208. Automated call center 202 may prompt user 208 to repeat instruction 106.

During stage 5, call center 202 utilizes software to execute the script generated in the previous stages 1-4, calling the originating cell phone and prompts user 208 with instruction 106. If the user does not answer, fails to repeat the recite instruction 106 correctly, or does not match digital voiceprint 120 created in the stage 1, the transaction is denied. Otherwise, user 208 is authenticated.

Figure 3:
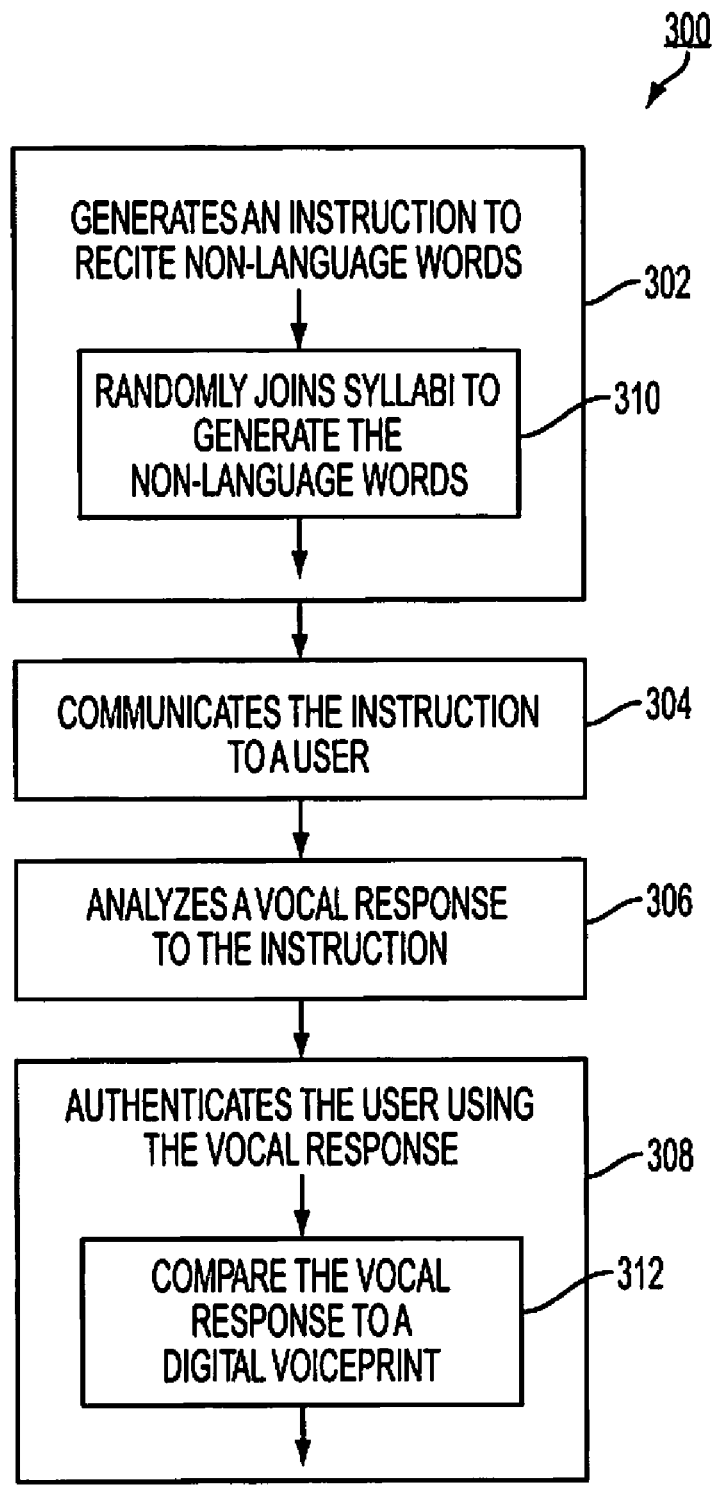
FIG. 3 is a flow chart diagram of a method for user authentication using non-language words in accordance with the present disclosure.

Referring to the drawings, FIG. 3 shows a flow chart diagram of a method 300 for user authentication using non-language words in accordance with the present disclosure. Method 300 includes acts 302 through 312. Act 302 generates an instruction (e.g., instruction 106 of FIG. 1) to recite non-language words and includes act 310 which randomly joins syllabi to generate the non-language words. Act 304 communicates the instruction (e.g., instruction 106 of FIG. 1) to a user. Act 306 analyzes a vocal response to the instruction. Act 308 authenticates the user using the vocal response. Act 308 includes act 312, which compares the vocal response to a digital voiceprint (e.g., digital voiceprint 120 of FIG. 1).

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of authenticating a user, comprising:
  receiving, by an authentication system, an electronic indication that a user is attempting to engage in a transaction;
  using one or more processors, authenticating the user's voice via a telephonic network connection, wherein authenticating the user's voice comprises:
  dynamically generating one or more non-language words from the authentication system, wherein the generated non-language words comprising concatenating randomly generated syllabi;
  transmitting an instruction to the user to speak the generated one or more non-language words over the telephonic network connection;
  receiving a signal over the telephonic network connection representing a vocal response by the user to the instruction to speak the one or more non-language words; and
  analyzing the vocal response to determine that the vocal response matches characteristics of a voice associated with an authorized user; and permitting the user to engage in the transaction in response to authenticating the voice of the user.

2. The method of claim 1, further comprising:
  prior to receiving the electronic indication that the user is attempting to engage in a transaction:
  receiving one or more samples of the user's voice during a registration process; and
  generating a digital voiceprint associated with the user using the one or more samples.

3. The method of claim 2, wherein determining that the vocal response matches characteristics of a voice associated with an authorized user further comprises:
  determining that the vocal response matches the digital voiceprint.

4. The method of claim 1, wherein authenticating the user's voice further comprises:
  selecting one or more language words;
  transmitting a second instruction to the user to speak the one or more language words over the telephonic network connection;
  receiving a second signal over the telephonic network connection representing a second vocal response by the user to the second instruction to speak the one or more language words; and
  analyzing the second vocal response to determine that the second vocal response matches characteristics of a voice associated with an authorized user.

5. The method of claim 4, further comprising:
  randomly selecting the one or more language words.

6. The method of claim 1, wherein authenticating the user's voice further comprises:
  transmitting a second instruction to the user to speak a password over the telephonic network connection;
  receiving a second signal over the telephonic network connection representing a second vocal response by the user to the second instruction to speak the password; and
  analyzing the second vocal response to determine that the second vocal response matches a password associated with an authorized user.

7. The method of claim 1, wherein authenticating the user's voice further comprises:
- transmitting a second instruction to the user to provide a personal identification number (PIN) over the telephonic network connection;
- receiving a second signal over the telephonic network connection representing a PIN provided by the user in response to the second instruction; and
- determining that the PIN provided by the user matches a PIN associated with an authorized user.

8. The method of claim 7, wherein the PIN provided by the user is received as a vocal response by the user.

9. The method of claim 7, wherein the PIN provided by the user is received through entry on a keypad.

10. The method of claim 1, wherein authenticating the user's voice further comprises:
- receiving a second signal over the telephonic network connection representing a telephone number associated with the user as part of the telephonic network connection; and
- determining that telephone number associated with the user matches a telephone number associated with an authorized user.

11. A system configured to authenticate a user, comprising:
- a processing system comprising one or more processors; and a memory system comprising one or more computer-readable media, wherein the computer-readable media contain computer instructions that, when executed by the processing system, cause the processing system to perform operations comprising:
- receiving, by an authentication system, an electronic indication that a user is attempting to engage in a transaction;
- using one or more processors, authenticating the user's voice via a telephonic network connection, wherein authenticating the user's voice comprises:
- dynamically generating one or more non-language words from the authentication system, wherein the generated non-language words comprising concatenating randomly generated syllabi;
- transmitting an instruction to the user to speak the generated one or more non-language words over the telephonic network connection;
- receiving a signal over the telephonic network connection representing a vocal response by the user to the instruction to speak the one or more nonlanguage words; and
- analyzing the vocal response to determine that the vocal response matches characteristics of a voice associated with an authorized user; and
- permitting the user to engage in the transaction in response to authenticating the voice of the user.

12. The system of claim 11, the operations further comprising:
- prior to receiving the electronic indication that the user is attempting to engage in a transaction:
  - receiving one or more samples of the user's voice during a registration process; and
  - generating a digital voiceprint associated with the user using the one or more samples.

13. The system of claim 12, wherein determining that the vocal response matches characteristics of a voice associated with an authorized user further comprises:
- determining that the vocal response matches the digital voiceprint.

14. The system of claim 11, wherein authenticating the user's voice further comprises:
- selecting one or more language words;
- transmitting a second instruction to the user to speak the one or more language words over the telephonic network connection;
- receiving a second signal over the telephonic network connection representing a second vocal response by the user to the second instruction to speak the one or more language words; and
- analyzing the second vocal response to determine that the second vocal response matches characteristics of a voice associated with an authorized user.

15. The system of claim 14, the operations further comprising:
- randomly selecting the one or more language words.

16. The system of claim 11, wherein authenticating the user's voice further comprises:
- transmitting a second instruction to the user to speak a password over the telephonic network connection;
- receiving a second signal over the telephonic network connection representing a second vocal response by the user to the second instruction to speak the password; and
- analyzing the second vocal response to determine that the second vocal response matches a password associated with an authorized user.

17. The system of claim 11, wherein authenticating the user's voice further comprises:
- transmitting a second instruction to the user to provide a personal identification number (PIN) over the telephonic network connection;
- receiving a second signal over the telephonic network connection representing a PIN provided by the user in response to the second instruction; and
- determining that the PIN provided by the user matches a PIN associated with an authorized user.

18. The system of claim 17, wherein the PIN provided by the user is received as a vocal response by the user.

19. The system of claim 17, wherein the PIN provided by the user is received through entry on a keypad.

20. The system of claim 11, wherein authenticating the user's voice further comprises:
- receiving a second signal over the telephonic network connection representing a telephone number associated with the user as part of the telephonic network connection; and
- determining that telephone number associated with the user matches a telephone number associated with an authorized user.

* * * * *